March 9, 1926.  A. E. SEHLBACH  1,575,870

DRINKING GLASS

Filed July 3, 1925

Inventor
Albert E. Sehlbach
By Fred Gerlach
his Atty.

Patented Mar. 9, 1926.

1,575,870

UNITED STATES PATENT OFFICE.

ALBERT E. SEHLBACH, OF CHICAGO, ILLINOIS, ASSIGNOR TO ALBERT PICK & COMPANY, OF CHICAGO, ILLINOIS, A CORPORATION OF ILLINOIS.

DRINKING GLASS.

Application filed July 3, 1925. Serial No. 41,259.

*To all whom it may concern:*

Be it known that I, ALBERT E. SEHLBACH, a citizen of the United States, and a resident of Chicago, in the county of Cook and State of Illinois, have invented certain new and useful Improvements in Drinking Glasses, of which the following is a full, clear, and exact description.

The invention relates to drinking glasses and its object is to provide an improved drinking glass which has a comparatively thin or fragile surrounding wall, such as results from manufacturing by the blowing process, in which the rim or mouth-engaging portion is protected from breakage resulting from striking and holding a number of glasses together, or from tipping the glass, which has its wall strengthened without sharp corners, which is formed so that it cannot be nested with like glasses, which can be easily cleansed, and which is formed with an annular depression to facilitate its internal and external gripping.

The invention consists in the several novel features hereinafter set forth and more particularly defined by claims at the conclusion hereof.

Figure 1:
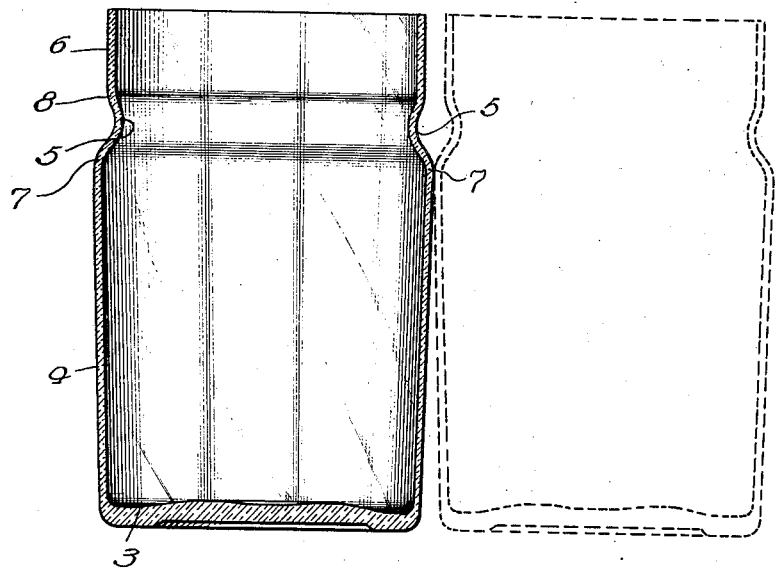
Figure 2:
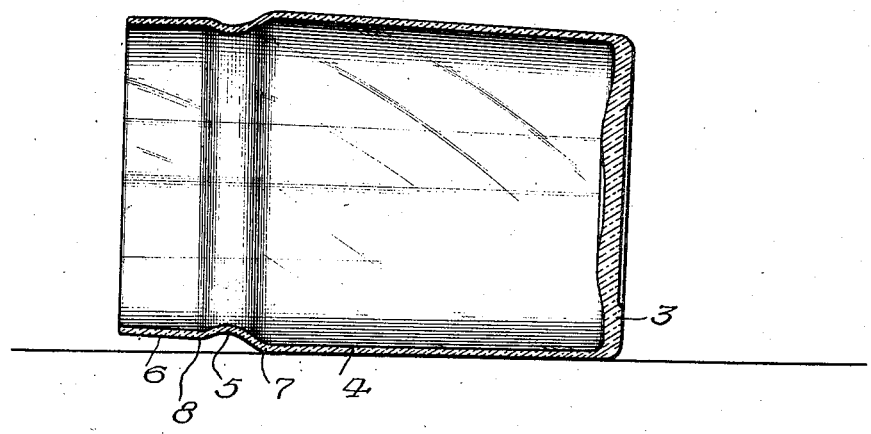

In the drawings: Fig. 1 is a section of a drinking glass embodying the invention, a second glass being shown in dotted lines. Fig. 2 is a similar view, illustrating the protection afforded the rim or mouth engaging portion of the glass when it is resting on its side.

The invention is exemplified in a drinking glass which comprises a bottom 3 and an integral generally cylindrical upwardly extending wall, which is formed of thin glass. This wall comprises a portion 4 extending upwardly from the bottom 3, and an annular external and concavely grooved portion 5, and an upper portion 6. The concavely grooved portion 5 is joined to the wall portion 4 by a gradually reversed curve, as at 7, and to the portion 6 by a gradually reversed curve 8. The wall portion 4 is usually tapered towards the bottom. When the wall portion 4 is tapered, its greatest diameter is immediately below the curve 7. The wall portion 6 is less in diameter than that of the portion 4, so that when the glasses are placed side-by-side or grasped in group by fingers inserted into the glasses, or when the glasses are tipped over, as shown in Fig. 2, the rims or mouth-engaging portions will be effectively protected from chipping or breakage by impact against the glasses or the support on which the tumblers may be tipped over. Wall portion 6 is preferably vertical, as contra-distinguished from being inturned or constricted at its upper end, so that while it is protected it can be drained without being tilted to an undesirable angle. The annular externally grooved portion 5 between portions 6 and 4 greatly increases the strength of the glass against breakage by crushing stresses or blows. This annularly grooved portion is comparatively shallow, so that it will not interfere with the washing of the glass. It also provides a seat for the fingers, so that the glasses may be securely held from the outside while drinking therefrom.

In handling these glasses after they have been used, it is customary to grasp a group of them by placing the fingers to grasp the group together. When this is done, the fingers are placed below the annularly grooved portion, so that they will have the effect of a shoulder to facilitate the gripping of the glasses. The pressure of the fingers applied at this point in this grouped gripping will tend to hold the glasses in engagement on lines extending vertically from the bottom to the annularly grooved portion, as contra-distinguished from a more localized contact, such as results from an outward projection from the general plane of the glass. By forming the upper portion 6 of a diameter which is smaller than the smallest diameter of the lower portion 4 of the glass, the nesting of the glasses is made impossible, which is desired for the purpose of preventing breakage. The nesting of the glasses has been found, in practice, to be a frequent cause of breakage.

The invention exemplifies an improved drinking glass, which is manufactured with a comparatively thin or blown surrounding wall, in which the general plane of the surrounding wall is cylindric and reinforced or strengthened by an annular external grooved portion, which is so shallow that the corresponding projection on the inner periphery of the glass will not materially interfere with its being properly cleansed, and will serve as an internal shoulder for group gripping; in which the rim or upper portion of the glass is less in diameter than the diameter of the portion below said grooved portion, so that it will be protected against chipping and breakage without the use of an inturned edge for that purpose; which is constructed, so that it cannot be nested with like glasses; and in which the external groove aids in holding the glass when drinking therefrom, and when it is grasped from the outside.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A drinking glass having a bottom and an integral thin tubular side wall comprising a lower portion extending upwardly from the bottom, an annular concave portion joined to and extending inwardly from said upwardly projecting portion and a portion above the grooved portion, forming a mouth-engaging rim, and being less in diameter than the diameter of said lower portion below the grooved portion so as to be protected thereby.

2. A drinking glass having a bottom and an integral thin tubular side wall comprising a lower portion extending upwardly from the bottom, an annular shallow concave portion joined by a gradual reverse curve to and extending inwardly from said upwardly projecting portion and a portion above and joined by a gradual reverse curve to the grooved portion, forming a mouth-engaging rim and being less in diameter than the diameter of said lower portion so as to be protected thereby.

3. A drinking glass having a bottom and an integral thin tubular side wall comprising a flared lower portion extending upwardly from the bottom, an annular shallow concave portion joined to and extending inwardly from said upwardly projecting portion and a non-flared portion above the grooved portion, forming a mouth-engaging rim and being less in diameter than the greatest diameter of the lower portion so as to be protected thereby.

Signed at Chicago, Illinois, this 24th day of June, 1925.

ALBERT E. SEHLBACH.